(No Model.)

E. E. DULIER.
ELASTIC WHEEL TIRE.

No. 583,362. Patented May 25, 1897.

Witnesses.
Ths. A. Gunn
Robert Evatt.

Inventor
Edward E. Dulier.
By James L. Norris.
Atty.

UNITED STATES PATENT OFFICE.

EDWARD E. DULIER, OF MILDENHALL, ENGLAND.

ELASTIC WHEEL-TIRE.

SPECIFICATION forming part of Letters Patent No. 583,362, dated May 25, 1897.

Application filed June 22, 1896. Serial No. 596,517. (No model.)

*To all whom it may concern:*

Be it known that I, EDWARD EUGENE DU-LIER, a citizen of Belgium, residing at Manor House, Mildenhall, in the county of Suffolk, England, have invented a certain new and useful Improvement in Elastic Wheel-Tires, of which the following is a specification.

My invention relates to elastic tires for the wheels of velocipedes and other vehicles; and it consists in the application to the treads of such tires of a caoutchouc band and metal ring so arranged and applied that the elastic material of the tire is protected from puncture or other injury, that the pressure is distributed over a large portion of the periphery, that there is a comparatively small extent of tread-surface in contact with the ground, and that this tread-surface is of such a character that there is little or no tendency to slip. For this purpose I apply to the tire a band and ring, as I shall describe, referring to the accompanying drawings, which illustrate my invention as applied to a pneumatic tire.

Figure 1:
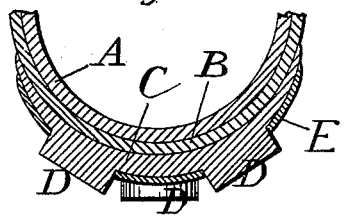
Figure 2:
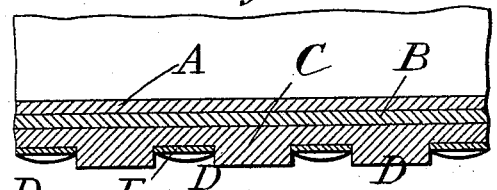
Figure 3:
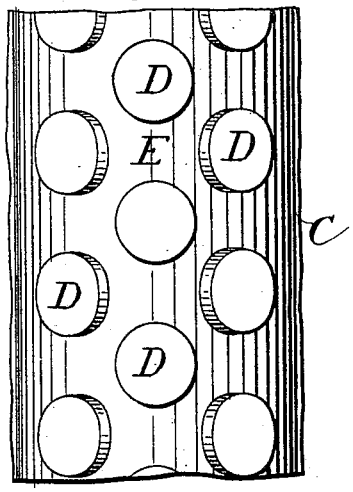

Figure 1 is a part transverse section, and Fig. 2 is a part longitudinal section. Fig. 3 is a plan looking from below.

A is the tube of an ordinary pneumatic tire, with its cover B made, as usual, of composite fabric and fixed to the rim in any known manner, which I do not illustrate, as it forms no part of my invention. To the outer or tread side of the cover B, I cement a caoutchouc band C, which is made with several rows of projecting studs D. On this band I place a ring E, of steel or other suitable sheet metal, which is curved in section to fit against the band C, is somewhat narrower than the band, and is perforated with holes to receive the studs D. When the ring E is in its place, the studs D project through it and, bearing on the track, prevent slipping, while the ring distributes the pressure of the tread over a large portion of the periphery of the tire, protects the elastic material, and, being rigid, makes the surface in contact with the track narrower than when the elastic material itself is pressed on the track.

Having thus described the nature of this invention and the best means I know of carrying the same into practical effect, I claim—

The combination with a pneumatic wheel-tire, of a continuous metallic ring having rows of orifices, and a continuous caoutchouc band secured to the tire and formed integral with rows of projecting studs which extend through and fill the holes in the continuous metallic ring and project beyond the surface of said ring, substantially as and for the purposes described.

In testimony whereof I have signed my name to this specification, in the presence of two subscribing witnesses, this 8th day of June, A. D. 1896.

EDWARD E. DULIER.

Witnesses:
 OLIVER IMRAY,
 JNO. P. M. MILLARD.